United States Patent
Yang et al.

(10) Patent No.: US 7,929,983 B2
(45) Date of Patent: Apr. 19, 2011

(54) METHOD AND APPARATUS FOR NEIGHBOR CELL SYNCHRONIZATION

(75) Inventors: Shuai Yang, Beijing (CN); Teng Han, Beijing (CN); Yan Wu, Beijing (CN); Xiaoming Cheng, Beijing (CN)

(73) Assignee: Via Technologies, Inc., Taipei (TW)

( * ) Notice: Subject to any disclaimer, the term of this patent is extended or adjusted under 35 U.S.C. 154(b) by 665 days.

(21) Appl. No.: 11/874,898

(22) Filed: Oct. 18, 2007

(65) Prior Publication Data

US 2008/0233988 A1    Sep. 25, 2008

(30) Foreign Application Priority Data

Mar. 19, 2007    (CN) .......................... 2007 1 0087773

(51) Int. Cl.
*H04B 15/00* (2006.01)
*H04B 7/00* (2006.01)
*H04W 24/00* (2009.01)

(52) U.S. Cl. ...................... 455/502; 455/456.1; 455/500
(58) Field of Classification Search .................. 455/502, 455/503, 456.1, 456.2
See application file for complete search history.

(56) References Cited

U.S. PATENT DOCUMENTS

| 7,593,738 | B2 * | 9/2009 | Anderson .................. 455/456.1 |
| 7,593,746 | B2 * | 9/2009 | Willenegger et al. ......... 455/522 |
| 7,633,927 | B2 * | 12/2009 | Ruohonen et al. ............ 370/350 |
| 2004/0152478 | A1 | 8/2004 | Ruohonen et al. |
| 2007/0010203 | A1 * | 1/2007 | Wee et al. .................... 455/63.1 |
| 2007/0037594 | A1 * | 2/2007 | Palenius et al. ............... 455/502 |

FOREIGN PATENT DOCUMENTS

CN    1745591    3/2006

* cited by examiner

*Primary Examiner* — Tilahun Gesesse
(74) *Attorney, Agent, or Firm* — Squire, Sanders & Dempsey (US) LLP

(57) ABSTRACT

The present invention is directed to a neighbor cell synchronization method for a mobile communication unit. The method includes selecting a neighbor cell according to a scheduling mechanism; determining a synchronization window according to a communicating mode of the mobile communication unit; and searching or decoding specific logic channels within the synchronization window. The present invention also provides an apparatus for performing the method.

20 Claims, 4 Drawing Sheets

METHOD AND APPARATUS FOR NEIGHBOR CELL SYNCHRONIZATION

BACKGROUND OF THE INVENTION

1. Field of the Invention

The present invention generally relates to wireless communication technology and more particularly to a neighbor cell synchronization method and apparatus for a mobile communication unit.

2. Description of the Prior Art

Wireless mobile communication systems have become more and more popular in recent years. In addition to be used as the telecommunication system for voice communication, they may also be used as the transmitting media for digital data. A wireless mobile communication system is generally in charge of the communication between Mobile Communication Units, such as cell phones, and Base Stations. The communication range covered by a base station is called a "cell". A single mobile communication unit may lie in an area reachable by several cells.

A mobile communication unit must always keep in synchronization with reachable cells, or neighbor cells, so as to guarantee that backup communication channels to the telecommunication system are available all the time. The synchronization herein means identifying the time difference between the mobile communication unit and the neighbor cells such that the mobile communication unit may rapidly get BSIC (Base Station Identity Code) and other synchronizing information necessary for handover between base stations.

The GSM (Global System for Mobile Communication) protocol uses TDMA (Time-Division Multiple-Access) mechanism which divides every single frame lasting for 4.615 microseconds into 8 time slots. Each time slot may carry user information or control information. According to the type of the carried information, different logic channel may be defined on a time slot. Basically, a logic channel which carries user information is called a TCH (Traffic Channel) and a logic channel which carries control information is called a Control Channel. Typical control channels include FCCHs (Frequency Correction Channels), SCHs (Synchronization Channels), BCCHs (Broadcast Control Channels) and CCCHs (Common Control Channels). The BSIC information mentioned above lies in SCH. The neighbor cell synchronization for a mobile communication unit aims to search and decode the FCCHs and SCHs of neighbor cells.

The environments in which a mobile communication unit is located may have a plurality of neighbor cells. For example, the GSM protocol requires that a mobile communication unit must handle up to 6 neighbor cells and complete scanning all neighbor cells within 30 seconds. In other words, the synchronization of a single neighbor cell must be completed within 2 to 5 seconds. A mobile communication unit toggles between the neighbor cell synchronization status and the normal status and consumes a lot of electric power for that. In view of the foregoing, there is a need to provide an efficient neighbor cell synchronization method to rapidly monitor the neighbor cells on the premise of economic electric power consumption.

SUMMARY OF THE INVENTION

An object of the present invention is to provide a neighbor cell synchronization method for a mobile communication unit to decrease electricity consumption of a battery.

Another object of the present invention is to provide a method to select neighbor cells for synchronization.

Another object of the present invention is to provide a method to set synchronization windows for neighbor cell synchronization.

Still another object of the present invention is to provide a mobile communication unit for performing the neighbor cell synchronization method with above aspects.

According to an embodiment, the present invention provides a neighbor cell synchronization method for a mobile communication unit, the method including following steps: determining if the mobile communication unit lies in a predetermined communicating mode feasible to perform neighbor cell synchronization by using a specific wide synchronization window, in which the specific wide synchronization window covers a plurality of contiguous frames; and searching or decoding specific logic channels of a neighbor cell within the specific wide synchronization window.

According to another embodiment, the present invention also provides a neighbor cell synchronization method for a mobile communication unit, the method including following steps: determining if the mobile communication unit lies in a predetermined communicating mode feasible to perform neighbor cell synchronization by using a specific narrow synchronization window, in which the specific narrow synchronization window covers the whole range of a specific frame, a first portion of a previous frame of the specific frame and a second portion of a next frame of the specific frame; and searching or decoding specific logic channels of a neighbor cell within the specific narrow synchronization window.

The present invention also provides a scheduling method to select a neighbor cell to be synchronized, the method including following steps: initializing a counter to a first predetermined value, the counter being assigned to correspond to a specific neighbor cell to be synchronized; altering the counter by a specific value when any neighbor cell other than the specific neighbor cell is selected; examining the counter to determine whether the specific neighbor cell to be synchronized can be selected or not, in which the specific neighbor cell to be synchronized can be selected only when the counter equals the first predetermined value; and setting the counter to a second predetermined value when the specific neighbor cell to be synchronized is selected.

The present invention also provides a mobile communication unit for implementing the method described above.

DETAILED DESCRIPTION OF THE INVENTION

Figure 1:
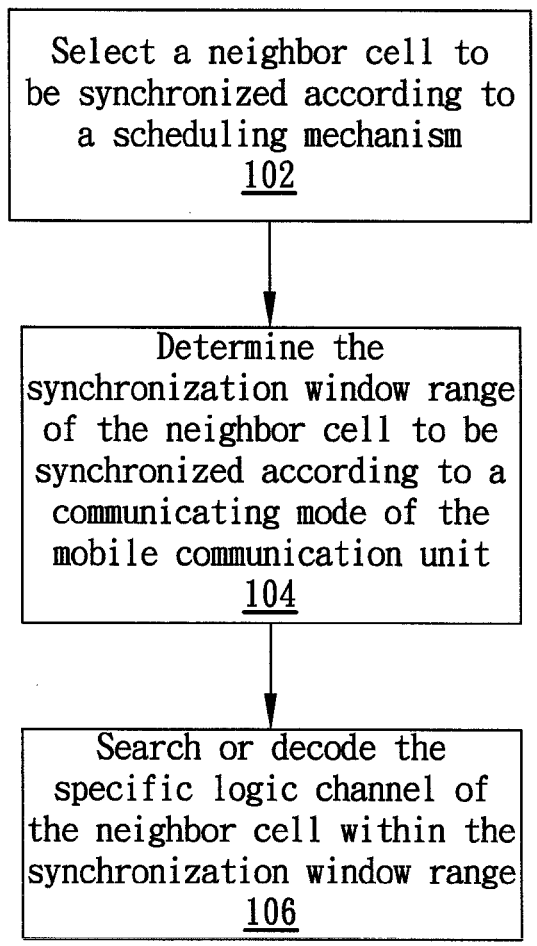
FIG. 1 shows a neighbor cell synchronization method for a mobile communication unit according to one embodiment of the present invention.

FIG. 1 shows a neighbor cell synchronization method for a mobile communication unit according to one embodiment of the present invention. In step 102, the method selects a neighbor cell to be synchronized according to a scheduling mechanism. Step 104 determines the synchronization window range of the neighbor cell to be synchronized according to a communicating mode of the mobile communication unit. Step 106 is to search or decode the specific logic channel of the neighbor cell within the synchronization window range. Details of above steps are described below.

Figure 2:
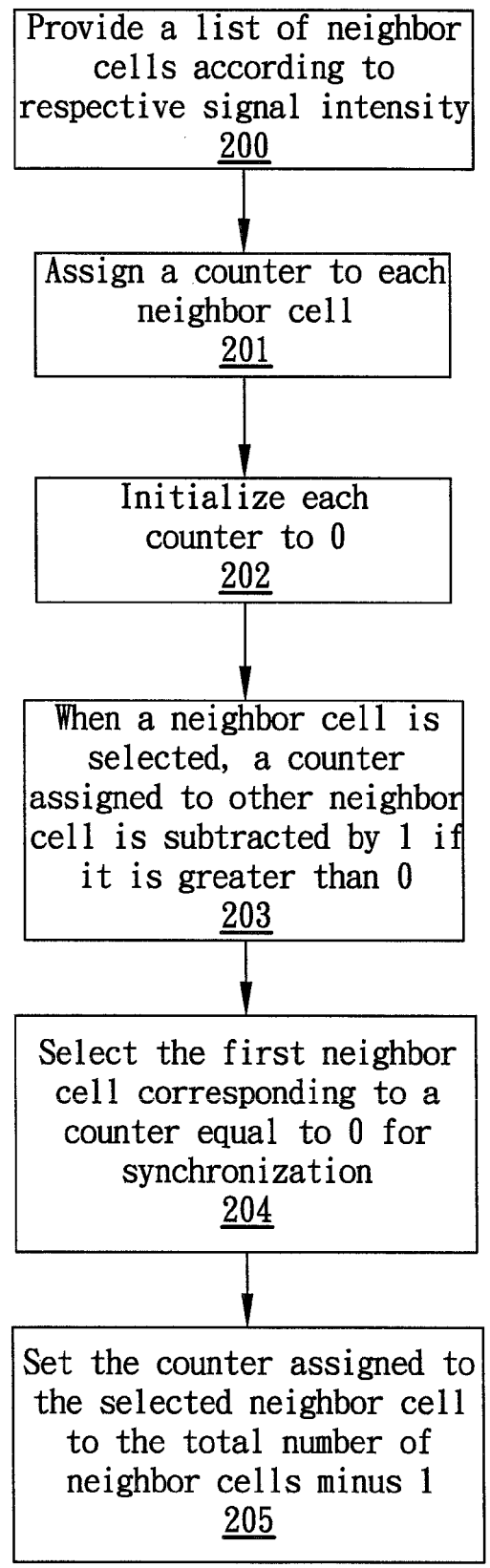
FIG. 2 shows a neighbor cell scheduling method according to one embodiment of the present invention.

Referring to step 102, the wireless communication environment where a mobile communication unit is located generally involves many neighbor cells at the same time. Step 102 determines if the mobile communication unit can select a neighbor cell to perform synchronization according to the content of a counter assigned to each neighbor cell. FIG. 2 shows a neighbor cell scheduling method according to one embodiment of the present invention. In this embodiment, the number of neighbor cells is up to 6 for a mobile communication unit compatible with the GSM protocol. The scheduling method includes following steps which are not necessarily executed in the sequence shown. First of all, a set of neighbor cells are provided in the form of a list according to respective signal intensity. Those skilled in the art should appreciate that the step of block 200 may be triggered periodically or by some signal. The sequence of the neighbor cell list provided in the present invention is not necessarily arranged according to signal intensity. They may also be arranged, for example, according to base stations' dynamic radio accessing capacity, types, performance and any other combinations thereof. Then, based on the specific cell sequence of the neighbor cell list, each neighbor cell is assigned a counter (block 201). In one embodiment, the specific sequence for neighbor cells may change in response to received signal intensity of each cell, but the corresponding assigned counter would not be changed accordingly. When the first time counters are assigned to neighbor cells or each time the specific sequence is changed due to reassigning of counters, each counter is initialized to 0 (block 202). When a neighbor cell is selected, counters assigned to other neighbor cells are subtracted by 1 if they are greater than 0 (block 203). The first neighbor cell corresponding to a counter reaching 0 is selected for synchronization (block 204). The counter assigned to the selected neighbor cell is then set to the total number of neighbor cells minus 1 (block 205). For example, the counter is set to 5 for a mobile communication unit in a GSM system, because a GSM mobile communication unit may handle up to 6 neighbor cells as mentioned above. Each time the mobile communication unit gets a new neighbor cell list, each counter may be reassigned to a new corresponding neighbor cell and may be reinitialized to 0 again. By utilizing the above scheduling method, every neighbor cell in the list will finally be selected for synchronization. If a selected neighbor cell fails to be synchronized more than a predetermined times, such as more than twice, it will be excluded from the candidate neighbor cells until another new set of neighbor cell sequence is triggered so as to save electricity power.

Those skilled in the art should be able to realize that the scheduling method of the present invention is not restricted to the exemplified cases mentioned above. For example, a counter can be initialized to any predetermined value besides 0, the 1 in the subtraction operation can be replaced with any specific value, and the counter of a selected neighbor cell may be set to other predetermined value. Such variations are apparently within the scope of the present invention.

Referring to step 104 of FIG. 1, it determines the synchronization window range of the neighbor cell to be synchronized according to the communicating mode of the mobile communication unit. The synchronization window means a period of time for the mobile communication unit to perform neighbor cell synchronization. Because synchronization aims to search the specific logic channel, such as a Frequency Correction Channel (FCCH), the synchronization window is also referred to as a search window. Depending on the mobile communication unit lies in the idle mode or non-idle mode, the density of specific logic frames available for neighbor cell synchronization differs a lot. For example, when the mobile communication unit is in idle mode, only limited signal exchanges between the mobile communication unit and the base stations, thus the mobile communication unit has more flexibility to select contiguous frames to monitor neighbor cells. However, when the mobile communication unit lies in talk mode, almost all frames are occupied by traffic channels (TCHs) which contain either data receiving time slots or data transmitting time slots and the density of frames available for neighbor cell synchronization is extremely sparse. For example, in the GSM system, for every 26 frames, there is only one idle frame feasible to perform the neighbor cell synchronization.

No matter what communicating mode it is, due to the temporal difference between the mobile communication unit and the neighbor cells as well as the indispensable overhead for mode switching, a synchronization window must include at least 9 time slots or 5625 Q-bit (Quarter Bit) in compliance with GSM specifications. According to the method of the present invention, the range covered by a synchronization window will expand to overlap part of the last frame and part of the next frame in addition to the whole current frame, so as to ensure that there is sufficient time to search a specific burst after taking into consideration the temporal difference and the switching overhead mentioned above.

Figures 3, 4:
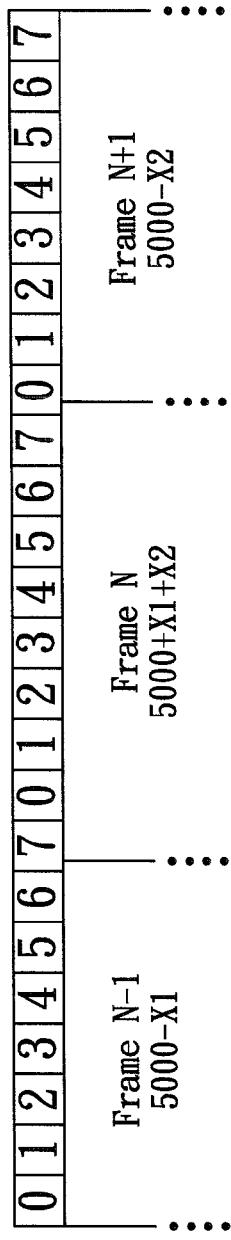
FIG. 3 shows a diagram to illustrate the range of a synchronization window according to one embodiment of the present invention.
FIG. 4 shows a typical multiple-frame logic channel configuration of a GSM system.

FIG. 3 shows a diagram to illustrate the range of a synchronization window according to one embodiment of the present invention. Based on the protocol of the GSM system, the duration of a single frame may be represented in the unit of "Q-bit", each Q-bit occupying the duration of one-forth bit. One frame contains 8 time slots, and every time slot (or burst) occupies 156.25 bits. Therefore, every frame includes 156.25×8=1250 bits which equal 5000 Q-bits. As shown in FIG. 3, the synchronization window expands to cover X1 Q-bits of the last frame N−1 and X2 Q-bits of the next frame N+1 in addition to the 5000 Q-bits of the frame N. In accordance with the present invention, the number X1 and X2 are both between 312 (or 625/2) and 625, in other words, the expanded duration represented by X1 or X2 is between half of a time slot and one time slot. Accordingly, the synchronization window SW covers 5000+X1+X2 Q-bits which contain at least 9 time slots. In other words, the length of the X1 portion of the last frame N−1 and the X2 portion of the next frame N+1 plus the frame N shall be at least 9 time slots or 5625 Q-bits according to one embodiment of present disclosure.

As mentioned above, when the mobile communication unit lies in idle mode, only limited data exchanges between the mobile communication unit and the base stations, and almost all frames can be used to synchronize with neighbor cells. FIG. 4 shows a typical multiple-frame logic channel configuration of a GSM system, in which F represents an FCCH (Frequency Correction Channel), S represents an SCH (Synchronization Channel), I represents an idle frame, and other designated numerals indicate the frame numbers of corresponding logic channels. For example, frame 0 is an FCCH, frame 1 is an SCH, frames 2 to 5 collectively form a Broadcast Control Channel (BCCH), and frames 6 to 9 collectively form a Common Control Channel (CCCH) which can be used as a Paging Channel (PCH). As can be noted in FIG. 4, because it needs 9 time slots to perform synchronization, the synchronization window of the present invention must cover at least 11 contiguous frames to ensure that an FCCH (Frequency Correction Channel) is included. In one embodiment of the present invention, the synchronization window may extend 12 frames to cover one SCH. The synchronization window may include 13 frames if the temporal difference from neighbor cells and the mode switching overhead are further considered.

According to another embodiment of the present invention, in the idle mode, the synchronization window is selected such that it could be as close to a PCH as possible. For example, still referring to FIG. 4, if the PCH lies in a CCCH of frames 6 to 9, then the synchronization window may be selected to lie in the frames 10 to 21. If the PCH lies in a CCCH of frames 26 to 29, then the synchronization window may be selected to lie in the frames 30 to 41. In such deliberate arrangements, the frequency of mode switching during a neighbor cell synchronization operation for the mobile communication unit can then be reduced and more economic power consumption may accordingly be achieved.

According to another embodiment of the present invention, the mobile communication unit lies in a non-idle mode which involves special logic channels. In such case, it may also use contiguous frames as a synchronization window. For example, in the GSM system, if the multiple-frame layout in the non-idle mode includes an SDCCH (Standalone Dedicated Control Channel), then depending upon the category of the SDCCH, the synchronization window may be selected to cover different set of 21 contiguous frames. SDCCH may be distributed in totally 21 frames, ranging from frame number 0 to frame number 101. The following table illustrates possible frame assignment of a synchronization window corresponding to different SDCCH categories in accordance with the present invention.

| Standalone Dedicated Control Channel Category | Synchronization Window Frame Assignment |
| --- | --- |
| SDCCH4/0 or SDCCH4/1 | 0-20 |
| SDCCH4/2 or SDCCH4/3 | 61-81 |
| SDCCH8/0 | 74-94 |
| SDCCH8/1 | 78-98 |
| SDCCH8/2 | 82-0(82-101 and 0) |
| SDCCH8/3 | 86-4(86-101 and 0-4) |
| SDCCH8/4 | 41-61 |
| SDCCH8/5 | 45-65 |
| SDCCH8/6 | 49-69 |
| SDCCH8/7 | 53-73 |

The talk mode is the busiest status of a mobile communication unit. As described above, in the GSM system, for every 26 frames, there existing only one idle frame feasible to perform the neighbor cell synchronization. According to another embodiment of the present invention, in the talk mode, the synchronization window may include the special frame window as illustrated in FIG. 3. As long as the aggregated range of these special frame windows exceeds 11 frames, the FCCH to be searched will not be missed in the synchronization process.

Figure 5:
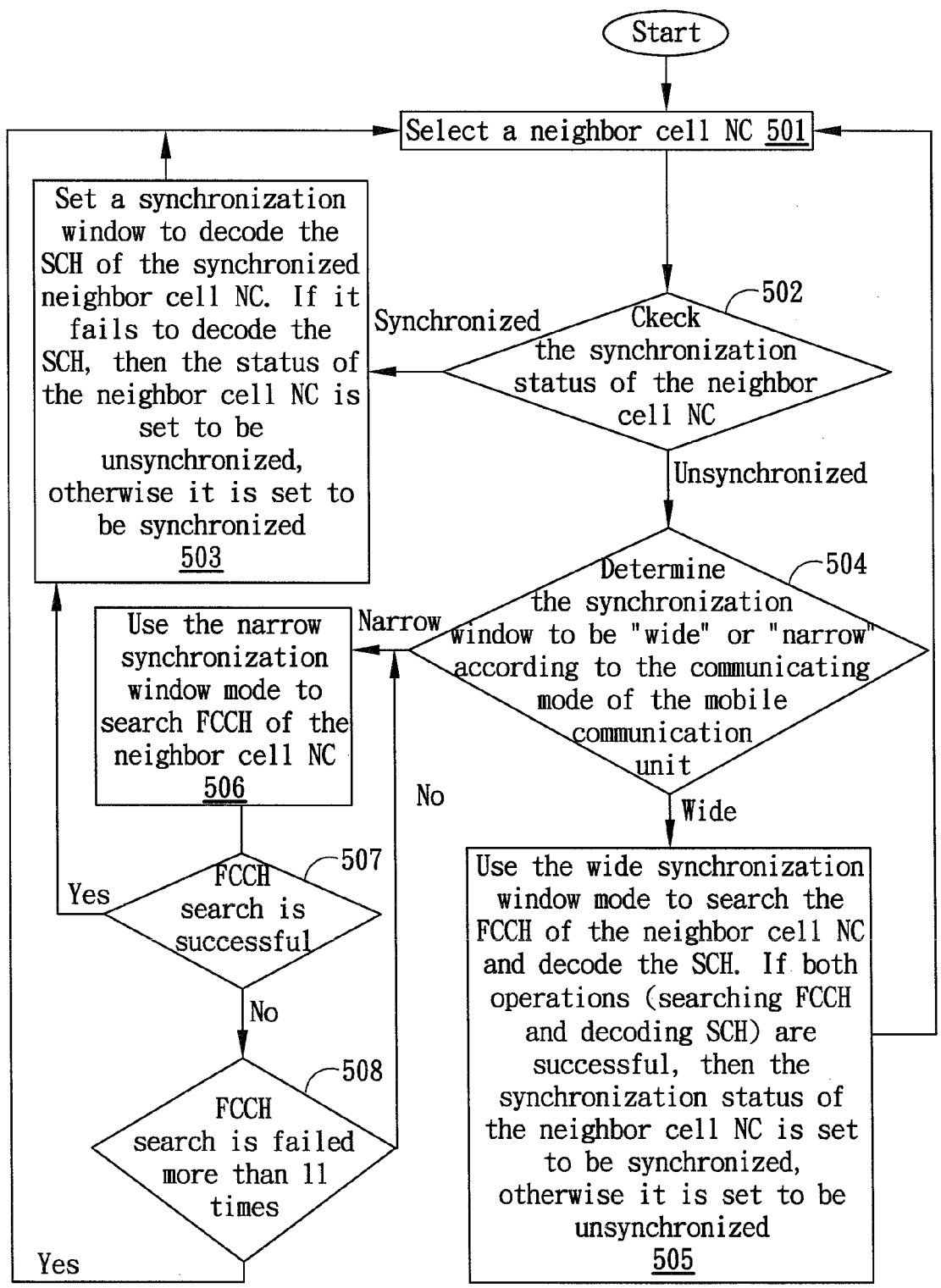
FIG. 5 shows a flow chart of a neighbor cell synchronization method based on the GSM or its compatible systems according to one embodiment of the present invention.

Back to FIG. 1, step 106 is used to search or decode a neighbor cell's specific logic channel within the synchronization window. As described above, this step is to search FCCH and/or SCH of a neighbor cell. Depending on different neighbor cell synchronization status and different mobile communication unit communicating mode, the neighbor cell synchronization method according to the present invention may set different synchronization window as described above and try to search an FCCH and/or decode an SCH. Moreover, the synchronization status of a neighbor cell will be updated based on the result of the searching and decoding process. FIG. 5 illustrates such concept embodied in the GSM or other like system by a flow chart, as will be detailed below.

FIG. 5 shows a flow chart of a neighbor cell synchronization method based on the GSM or its compatible systems according to one embodiment of the present invention. A neighbor cell NC is selected in step 501 by using a scheduling method such as the one shown in FIG. 2 as illustrated in step 102 of FIG. 1. The synchronization status of the neighbor cell NC is checked in step 502. When the mobile communication unit ever successfully located the FCCH of the neighbor cell NC and never failed to decode the SCH thereof, then the synchronization status of the neighbor cell NC is synchronized, otherwise it is construed as unsynchronized. In step 503, a synchronization window is set to decode the SCH of the synchronized neighbor cell NC. If it fails to decode the SCH, then the status of the neighbor cell NC is set to be unsynchronized, otherwise it is set to be synchronized. As described above, the FCCH of a synchronized neighbor cell NC has been successfully located (and the SCH decoding never failed), therefore, the position of next SCH in the present synchronization window may be inferred based on the relative positions of SCH and FCCH. In step 504, the synchronization window is determined to be "wide" or "narrow" according to the communicating mode of the mobile communication unit. When the mobile communication unit is in idle mode or in non-idle mode with SDCCH, then it can flexibly select contiguous frames as the synchronization window. This mode is called the wide window mode or the wide synchronization window mode. On the contrary, when the mobile communication unit is in a busy status such as the talk mode, then only one frame out of every 26 frames may be selected to be the synchronization window. This mode is called the narrow window mode or the narrow synchronization window mode. Needless to say, according to the present invention, the narrow synchronization window must meet the conditions shown in FIG. 3. Step 505 uses the wide synchronization window mode to search the FCCH of the neighbor cell NC and decode the SCH. If both operations (searching FCCH and decoding SCH) are successful, then the synchronization status of the neighbor cell NC is set to be synchronized, otherwise it is set to be unsynchronized. Step 506 uses the narrow synchronization window mode to search FCCH of the neighbor cell NC. If the search is successful, then jump to step 503 to perform decoding of SCH (step 507). If the search is failed more than 11 times, then jump to step 501 to select next neighbor cell (step 508).

Figure 6:
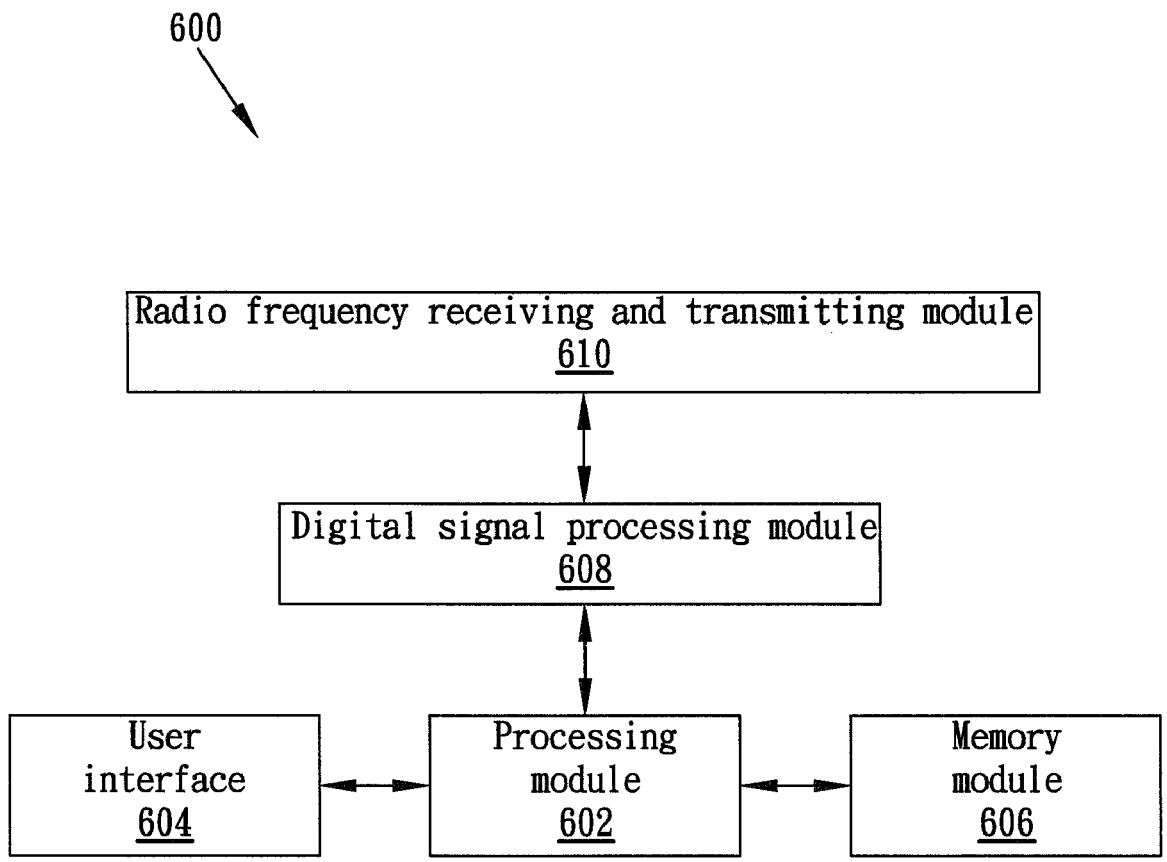
FIG. 6 shows a block diagram of a typical mobile communication unit.

The present invention also includes an apparatus, such as a mobile communication unit, to implement the method described above. FIG. 6 shows a block diagram of a typical mobile communication unit 600 which includes a processing module 602, a user interface 604, a memory module 606, a digital signal processing module 608, and a radio frequency receiving and transmitting module 610. The processing module 602 may include a central processing unit in a microprocessor configuration which cooperates with the programs or instruction codes stored in the memory module 606 to perform specific jobs, such as the disclosed neighbor cell synchronization method according to the present invention. These programs or instruction codes may also include the instructions executable by the digital signal processing module 608. The memory module 606 may include, but not limit to, a Dynamic Random Access Memory (DRAM) or other types of Random Access Memory (RAM), an Electrically- Erasable Programmable Read Only Memory (EEPROM) or other types of Read Only Memory (ROM), and a removable external memory device such as a Smart Card or a Subscriber Identity Card (SIM). The memory module 606 may be loaded with a specific Operating System (OS) and the programs implementing the neighbor cell synchronization method according to the present invention. The user interface 604 may include user I/O devices such as a keyboard, a display, a microphone and a speaker (not shown in the figure). The radio frequency receiving and transmitting module 610 may include or connect to a radio frequency antenna (not shown in the figure) and is in charge of receiving and transmitting of radio frequency signal.

According to an embodiment of the present invention, the processing module 602 may include a determining module configured to determine that if the mobile communication unit lies in a predetermined communicating mode feasible to perform neighbor cell synchronization by using a specific wide synchronization window which covers a plurality of contiguous frames. The processing module 602 may also include a wide searching unit configured to search or decode a neighbor cell's specific logic channel, such as an FCCH or an SCH, within the specific wide synchronization window. According to another embodiment of the present invention, the processing module 602 may include a determining module configured to determine that if the mobile communication unit lies in a predetermined communicating mode feasible to perform neighbor cell synchronization by using a specific narrow synchronization window which covers the whole range of a specific frame, a first portion of a previous frame of the specific frame and a second portion of a next frame of the specific frame. The processing module 602 may also include a narrow searching unit configured to search or decode a neighbor cell's specific logic channel, such as an FCCH or an SCH, within the specific narrow synchronization window. According to another embodiment of the present invention, the processing module 602 may include a neighbor cell selection unit configured to select a neighbor cell to be synchronized according to the flow chart shown in FIG. 2.

Although specific embodiments have been illustrated and described, it will be appreciated by those skilled in the art that various modifications may be made without departing from the scope of the present invention, which is intended to be limited solely by the appended claims.

What is claimed is:

1. A neighbor cell synchronization method for a mobile communication unit, the method comprising the steps of:
    determining if the mobile communication unit lies in a first predetermined communicating mode feasible to perform neighbor cell synchronization by using a specific wide synchronization window, wherein the specific wide synchronization window covers a plurality of contiguous frames;
    determining if the mobile communication unit lies in a second predetermined communicating mode feasible to perform neighbor cell synchronization by using a specific narrow synchronization window; and
    searching a neighbor cell's specific logic channel within the specific wide synchronization window; and
    scheduling to select a specific neighbor cell to be synchronized;
    wherein the first predetermined communicating mode is idle mode and the second predetermined communicating mode is talk mode.

2. The method of claim 1, wherein the plurality of contiguous frames are selected from the group consisting of: frames 0 to 20, frames 61 to 81, frames 74 to 94, frames 78 to 98, frames 82 to 101 and frame 0, frames 86 to 101 and frames 0 to 4, frames 41 to 61, frames 45 to 65, frames 49 to 69, and frames 53 to 73.

3. The method of claim 1, wherein the specific narrow synchronization window covers a whole range of a specific frame, a first portion of a previous frame of the specific frame and a second portion of a next frame of the specific frame, the method further comprising:
    searching the neighbor cell's specific logic channel within the specific narrow synchronization window.

4. The method of claim 3, wherein the first portion and the second portion are both between 312 Q-bits and 625 Q-bits.

5. The method of claim 3, wherein the sum of the lengths of the first and second portions plus the specific frame is at least 5625 Q-bits or 9 time slots.

6. The method of claim 1, wherein the scheduling step comprises:
    initializing a counter to a first predetermined value, the counter being assigned to correspond to the specific neighbor cell;
    altering the counter by a specific value when any neighbor cell other than the specific neighbor cell is selected for synchronization;
    examining the counter to determine whether the specific neighbor cell can be selected, wherein the specific neighbor cell can be selected only when the counter equals the first predetermined value; and
    setting the counter to a second predetermined value when the specific neighbor cell is selected for synchronization.

7. A mobile communication unit, which comprises a processing module for neighbor cell synchronization, the processing module comprising:
    a first determining unit, configured to determine that if the mobile communication unit lies in a first predetermined communicating mode feasible to perform neighbor cell synchronization by using a specific narrow synchronization window which covers a whole range of a specific frame, a first portion of a previous frame of the specific frame and a second portion of a next frame of the specific frame;
    a narrow searching unit, configured to search a neighbor cell's specific logic channel within the specific narrow synchronization window; and
    a neighbor cell selection unit, configured to select a specific neighbor cell for synchronization.

8. The mobile communication unit of claim 7, wherein the first portion and the second portion are both between 312 Q-bits and 625 Q-bits.

9. The mobile communication unit of claim 7, wherein the sum of the lengths of the first and second portions plus the specific frame is at least 5625 Q-bits or 9 time slots.

10. The mobile communication unit of claim 7, wherein the neighbor cell selection unit performs following steps to select the specific neighbor cell for synchronization:
    initializing a counter to a first predetermined value, the counter being assigned to correspond to the specific neighbor cell;
    altering the counter by a specific value when any neighbor cell other than the specific neighbor cell is selected for synchronization;
    examining the counter to determine whether the specific neighbor cell can be selected, wherein the specific neighbor cell can be selected only when the counter equals the first predetermined value; and setting the counter to a second predetermined value when the specific neighbor cell is selected for synchronization.

11. The mobile communication unit of claim 10, wherein the processing module further comprises:
 a second determining module, configured to determine that if the mobile communication unit lies in a second predetermined communicating mode feasible to perform neighbor cell synchronization by using a specific wide synchronization window which covers a plurality of contiguous frames; and
 a wide searching unit, configured to search the neighbor cell's specific logic channel within the specific wide synchronization window.

12. The mobile communication unit of claim 11, wherein the first predetermined communicating mode is idle mode and the second predetermined communicating mode is idle mode.

13. The mobile communication unit of claim 11, wherein the second predetermined communicating mode is a non-idle mode involving a Standalone Dedicated Control Channel (SDCCH) and the plurality of contiguous frames are selected from the group consisting of: frames 0 to 20, frames 61 to 81, frames 74 to 94, frames 78 to 98, frames 82 to 101 and frame 0, frames 86 to 101 and frames 0 to 4, frames 41 to 61, frames 45 to 65, frames 49 to 69, and frames 53 to 73.

14. A neighbor cell synchronization method for a mobile communication unit, comprising following scheduling steps:
 initializing a counter to a first predetermined value, the counter being assigned to correspond to a specific neighbor cell;
 altering the counter by a specific value when any neighbor cell other than the specific neighbor cell is selected for synchronization;
 examining the counter to determine whether the specific neighbor cell can be selected, wherein the specific neighbor cell can be selected only when the counter equals the first predetermined value; and
 setting the counter to a second predetermined value when the specific neighbor cell is selected for synchronization; and
 determining if the mobile communication unit lies in a first predetermined communicating mode feasible to perform neighbor cell synchronization by using a specific wide synchronization window, wherein the specific wide synchronization window covers a plurality of contiguous frames.

15. The method of claim 14, further comprising following steps:
 searching or decoding a neighbor cell's specific logic channel within the specific wide synchronization window.

16. The method of claim 15, wherein the first predetermined communicating mode is a non-idle mode involving a Standalone Dedicated Control Channel (SDCCH) and the plurality of contiguous frames are selected from the group consisting of: frames 0 to 20, frames 61 to 81, frames 74 to 94, frames 78 to 98, frames 82 to 101 and frame 0, frames 86 to 101 and frames 0 to 4, frames 41 to 61, frames 45 to 65, frames 49 to 69, and frames 53 to 73.

17. The method of claim 15, further comprising following steps:
 determining if the mobile communication unit lies in a second predetermined communicating mode feasible to perform neighbor cell synchronization by using a specific narrow synchronization window, wherein the specific narrow synchronization window covers a whole range of a specific frame, a first portion of a previous frame of the specific frame and a second portion of a next frame of the specific frame; and
 searching or decoding the neighbor cell's specific logic channel within the specific narrow synchronization window.

18. The method of claim 17, wherein the first predetermined communicating mode is idle mode and the second predetermined communicating mode is talk mode.

19. The method of claim 17, wherein the first portion and the second portion are both between 312 Q-bits and 625 Q-bits.

20. The method of claim 17, wherein the sum of the lengths of the first and second portions plus the specific frame is at least 5625 Q-bits or 9 time slots.

* * * * *